United States Patent [19]
Kusama

[11] Patent Number: 6,069,713
[45] Date of Patent: May 30, 2000

[54] IMAGE EDITING METHOD AND APPARATUS AND STORAGE MEDIUM

[75] Inventor: Kiyoshi Kusama, Yokohama, Japan

[73] Assignee: Canon Kabushiki Kaisha, Tokyo, Japan

[21] Appl. No.: 09/022,973

[22] Filed: Feb. 12, 1998

[30] Foreign Application Priority Data

Feb. 14, 1997 [JP] Japan ................................. 9-044882

[51] Int. Cl.[7] ................................................. H04N 1/387
[52] U.S. Cl. ......................................... 358/452; 358/537
[58] Field of Search ................................ 358/450, 452, 358/453, 540, 537; 382/153, 154, 284, 285, 294, 295; 345/435

[56] References Cited

U.S. PATENT DOCUMENTS

| | | | |
|---|---|---|---|
| 5,036,545 | 7/1991 | Iida et al. .................................. | 382/62 |
| 5,267,333 | 11/1993 | Aono et al. ............................... | 382/56 |
| 5,592,305 | 1/1997 | Iwadate et al. .......................... | 358/448 |
| 5,652,663 | 7/1997 | Zelten ...................................... | 358/447 |
| 5,657,402 | 8/1997 | Bender et al. ........................... | 382/284 |
| 5,687,306 | 11/1997 | Blank ....................................... | 395/135 |
| 5,781,198 | 7/1998 | Korn ........................................ | 345/435 |
| 5,815,645 | 9/1998 | Fredlund et al. ........................ | 395/117 |

*Primary Examiner*—Kimberly A. Williams
*Assistant Examiner*—Derrick Fields
*Attorney, Agent, or Firm*—Fitzpatrick, Cella, Harper & Scinto

[57] ABSTRACT

An image editing system obtains an object image defined by an output area and user specified depth information of the image object. On the basis of a comparison result of comparing depth information of the obtained image object with respect to respective depth information of objects read from a memory storing image data comprised of plural objects whose dephts are different and whose output areas are defined, the obtained image object is inserted into the image data stored in the memory.

40 Claims, 13 Drawing Sheets

IMAGE DATA (ORIGINAL)

INSERT IMAGE

IMAGE DATA (DEPTH)

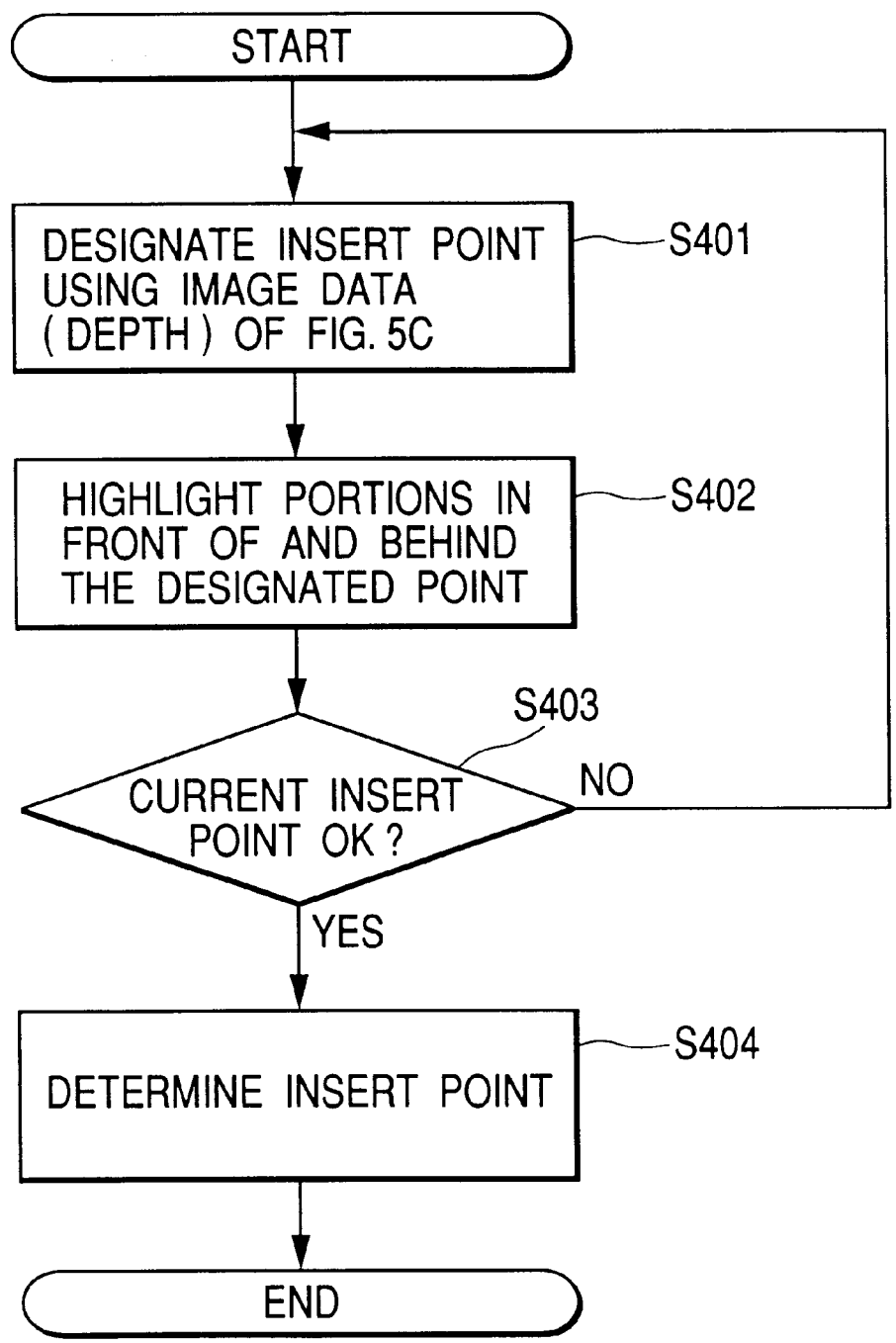

IMAGE DATA (ORIGINAL)

INSERT IMAGE

IMAGE DATA (DEPTH)

IMAGE DATA (ORIGINAL)

INSERT IMAGE

IMAGE DATA (DEPTH-ORIGINAL)

IMAGE DATA (DEPTH-INSERT)

IMAGE DATA AFTER INSERT

6,069,713

IMAGE EDITING METHOD AND APPARATUS AND STORAGE MEDIUM

BACKGROUND OF THE INVENTION

1. Field of the Invention

The invention relates to an image editing method and apparatus for editing an image such as a photograph, video image, or the like and to a storage medium which is used in the image editing method and apparatus.

The invention also relates to a technique for editing an image having depth.

The invention further relates to a technique for handling depth information.

The invention further relates to a technique for synthesizing a plurality of data.

2. Related Background Art

In recent years, an image editing apparatus for editing or modifying image data derived from an image input apparatus such as a digital camera or the like has been put to practical use. Hitherto, such an image editing apparatus has been used in the printing industry or the like in order to perform a cut-out of a human object including in read image data, an insertion of another image, or the like.

Such a conventional image editing apparatus comprises an image data reader 1300, an insert image reader 1301, an image processor 1302, a display 1303, an insert point designator 1304, and an image inserter 1305 as shown in, for example, FIG. 13.

The image data reader 1300 reads image data obtained by the image input apparatus such as a digital camera or the like and sends the image data to the image processor 1302. The image processor 1302 processes the image data so that the data sent from the image data reader 1300 can be displayed and transmits the processed data to the display 1303 or the like. The display 1303 displays the image data sent from the image processor 1302. The insert image reader 1301 subsequently reads an image to be inserted. Further, a position (or point) where the image is inserted is determined by the insert point designator 1304 comprising a pointing device such as a mouse or the like and is sent to the image inserter 1305. The image inserter 1305 sends the image inserted at the image insert point designated by the insert point designator 1304 to the image processor 1302. The result is displayed by the display 1303.

The above conventional apparatus, however, has a problem such that in case of performing an edition such as an insertion of an image, many trial and error operations have to be repeated and the operation becomes complicated and is executed at multistages. There is also a problem such that it is very difficult to insert an image into an image whose boundary is obscure.

SUMMARY OF THE INVENTION

It is an object of the invention to enable an insert point of a first image into a second image to be easily designated by using image data and depth information.

Another object of the invention is to enable an editing instruction of image data to be easily performed by using information showing depth of image data.

Still another object of the invention is to provide depth information of an image by a style which can be easily understood by the user and to enable a grasp of a depth and an editing instruction to be easily and certainly performed.

A further object of the invention is to enable an editing point or the like to be automatically discriminated from an analysis result of an input image.

BRIEF DESCRIPTION OF THE DRAWINGS

FIG. 4 is a flowchart for explaining the designating operation of an insert point of the image data in the image editing apparatus;

DETAILED DESCRIPTION OF THE PREFERRED EMBODIMENTS

Figure 14:
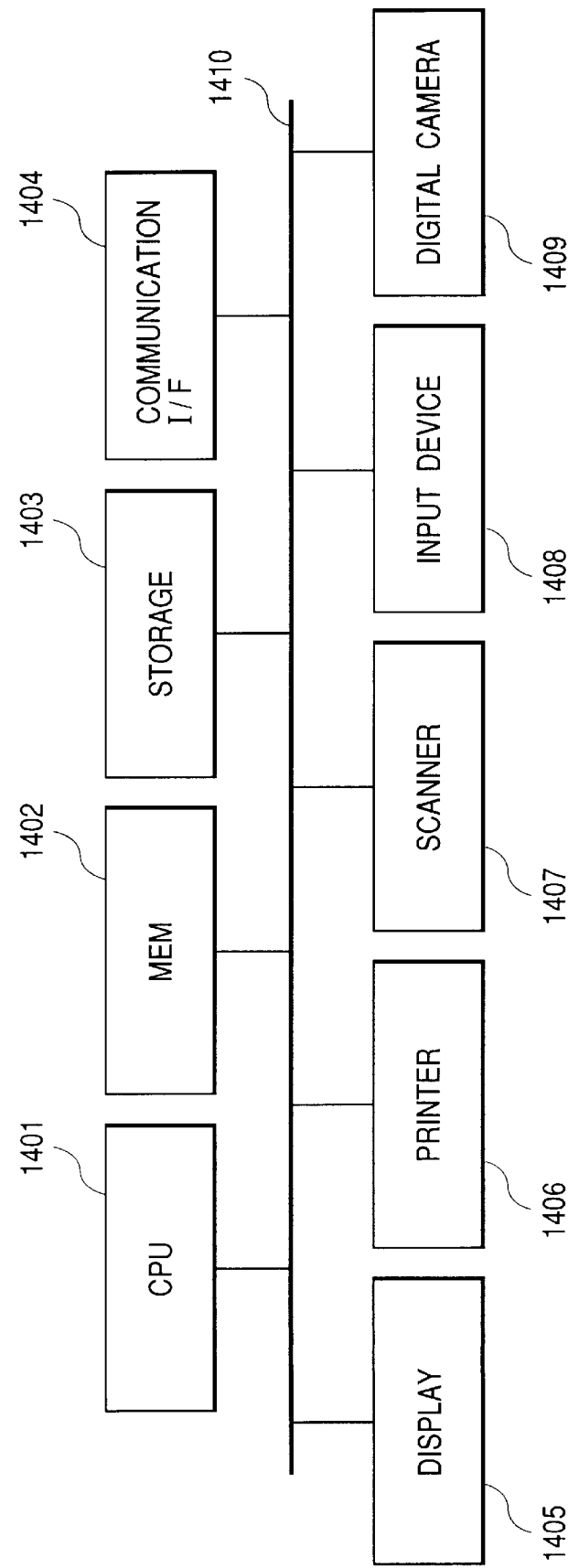
FIG. 14 is a constructional block diagram of the apparatus according to the invention.

Embodiments of the invention will be described hereinbelow with reference to FIGS. 1, 2, 3A to 3C, 4, 5A to 5C, 6 to 9, 10A to 10D, 11 and 12. Each embodiment of the invention is realized by a construction shown in FIG. 14. Each component element of FIG. 14 will now be described.

A CPU 1401 executes processes in an apparatus of the invention in accordance with a control program stored in a MEM (memory) 1402 or a storage (or storage medium) 1403.

The MEM 1402 is a ROM or RAM and stores the control program of processes shown in flowcharts, which will be explained hereinlater, an inputted image or text, and various parameters. The data can be previously stored in the MEM 1402 or can also be downloaded from the storage 1403 or from another terminal through a communication interface. A working area to store the data in the middle of the process is also provided in the MEM 1402. The storage 1403 is a storage medium such as CD-ROM, CD-R, FD, or the like which is detachable form the apparatus and can be read or written by a computer. The communication interface controls the transmission and reception to/from the other terminal through a communication line such as public line, LAN, or the like.

A display 1405 is a display such as a liquid crystal display, CRT, or the like which can display an image. Messages and software keys which are necessary for the operation regarding the invention are also displayed on the display 1405. A printer 1406 is a printer such as LBP (laser beam printer), BJ (bubble jet printer, ink jet printer), or the like which can print an image. A scanner 1407 optically reads an image of an original. An input device 1408 is a keyboard which can input a text or various instruction commands or a pointing device such as mouse, track pad, or tablet which can input desired coordinate data on a display screen of the display 1405. A digital camera 1409 picks up image data of an object and inputs depth information of the photographed object by using an attached sensor. The depth information denotes an absolute distance at each pixel of the photographed image data, namely, distance of the pixel from the camera to the photographed object expressed on the pixel or a relative distance in case of setting a certain pixel to a reference. The depth information is not stored with respect to all of the pixels of the image obtained by photographing the object, but is stored with respect to the pixels which were thinned out, for instance, on every second or third pixel or the like. Or, no depth information is stored with regard to the adjacent pixels having the same parameter such as same color, same brightness, or the like and only link data to the pixels of the same parameter can also be held. It is also possible to construct in a manner such that the color or brightness of each pixel of the photographed image is analyzed, boundaries of a plurality of objects photographed are obtained in the image, and a dedicated area and depth information are stored for every object.

Data is transmitted and received among the component elements via a bus 1410.

[First embodiment]

Figure 1:
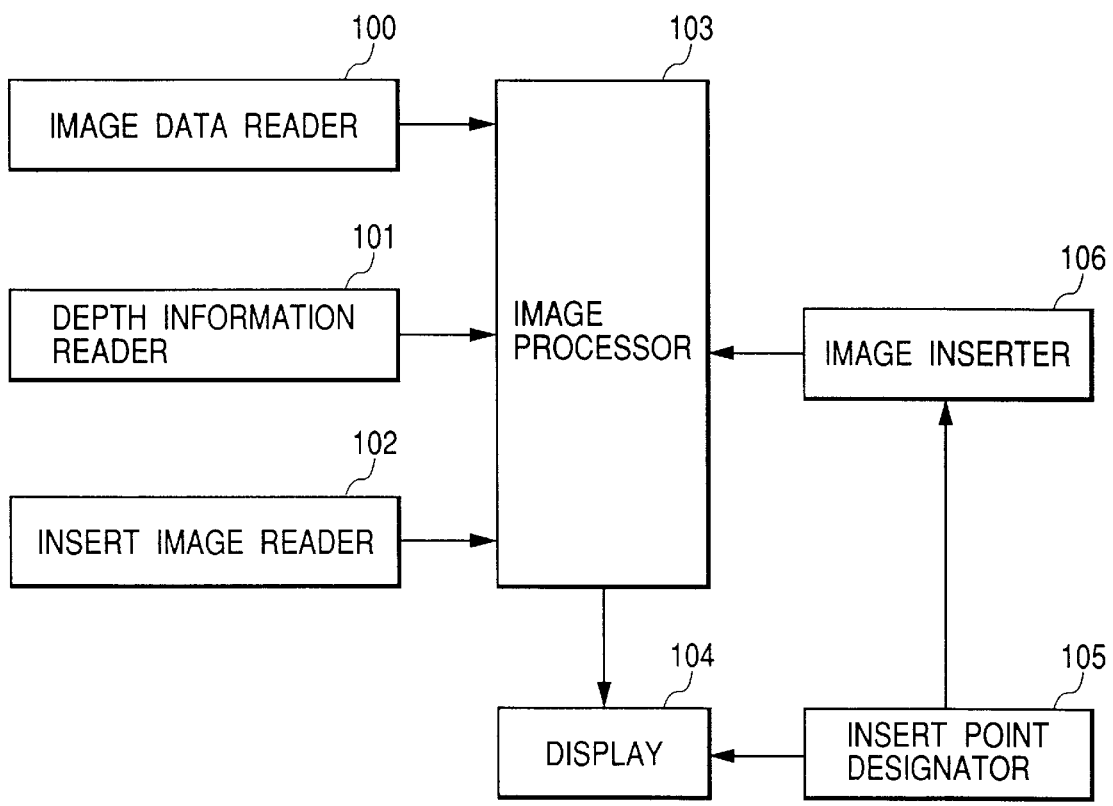
FIG. 1 is a block diagram showing a construction of an image editing apparatus according to the first embodiment of the invention.

The first embodiment of the invention will be first described with reference to FIGS. 1, 2, 3A to 3C, 4, 5A to 5C and 6. FIG. 1 is a block diagram showing a construction of an image editing apparatus according to the first embodiment of the invention. The image editing apparatus comprises an image data reader 100, a depth information reader 101, an insert image reader 102, an image processor 103, a display 104, an insert point designator 105, and an image inserter 106.

The image reader 100 reads image data obtained by photographing an object by the image input apparatus 1409 such as a digital camera or the like. The depth information reader 101 reads depth information obtained by using a sensor or the like annexed to the image input apparatus 1409 such as a digital camera or the like. The insert image reader 102 reads an image which is inserted into the image data read by the image data reader 100. The insert image data can be inputted by the scanner 1407 or digital camera 1409 or can be also read from the storage 1403 or from another terminal through a communication interface 1404. The image processor 103 converts the depth information derived by the depth information reader 101 into image data showing the depth information by changing a density in a manner such that a near portion is set to be white and a far portion is set to be black. The converting process from the depth information to the image data is realized in a manner such that a table or converting equation in which a parameter indicative of the depth and a density parameter are correlated is previously stored into the MEM 1402 and the depth information is converted into density information by such data and is allocated to the relevant pixel. The display 104 comprising the display 1405 or the like displays the image data obtained by the image data reader 100, the depth information converted to the image data by the image processor 103, and the insert image obtained by the insert image reader 102. The insert point designator 105 is the pointing device 1408 such as mouse or track pad and designates the insert point on the image of the depth information displayed by the display 104. The image inserter 106 inserts the image read by the insert image reader 102 to the point, namely, depth position designated on the image of the depth information by the insert point designator 105. By the inserting process, an image can be derived as if the object photographed in the insert image was photographed in a state where the object existed at the designated depth point of the object photographed in the image on the insert destination side.

Although various component elements for performing the printing and the character input other than the above component elements are provided for the image editing apparatus, since they are not an essence of the invention, their descriptions are omitted.

The reading operation of the image data and depth information in the image editing apparatus constructed as mentioned above will now be described with reference to the flowchart of FIG. 2.

Figure 2:
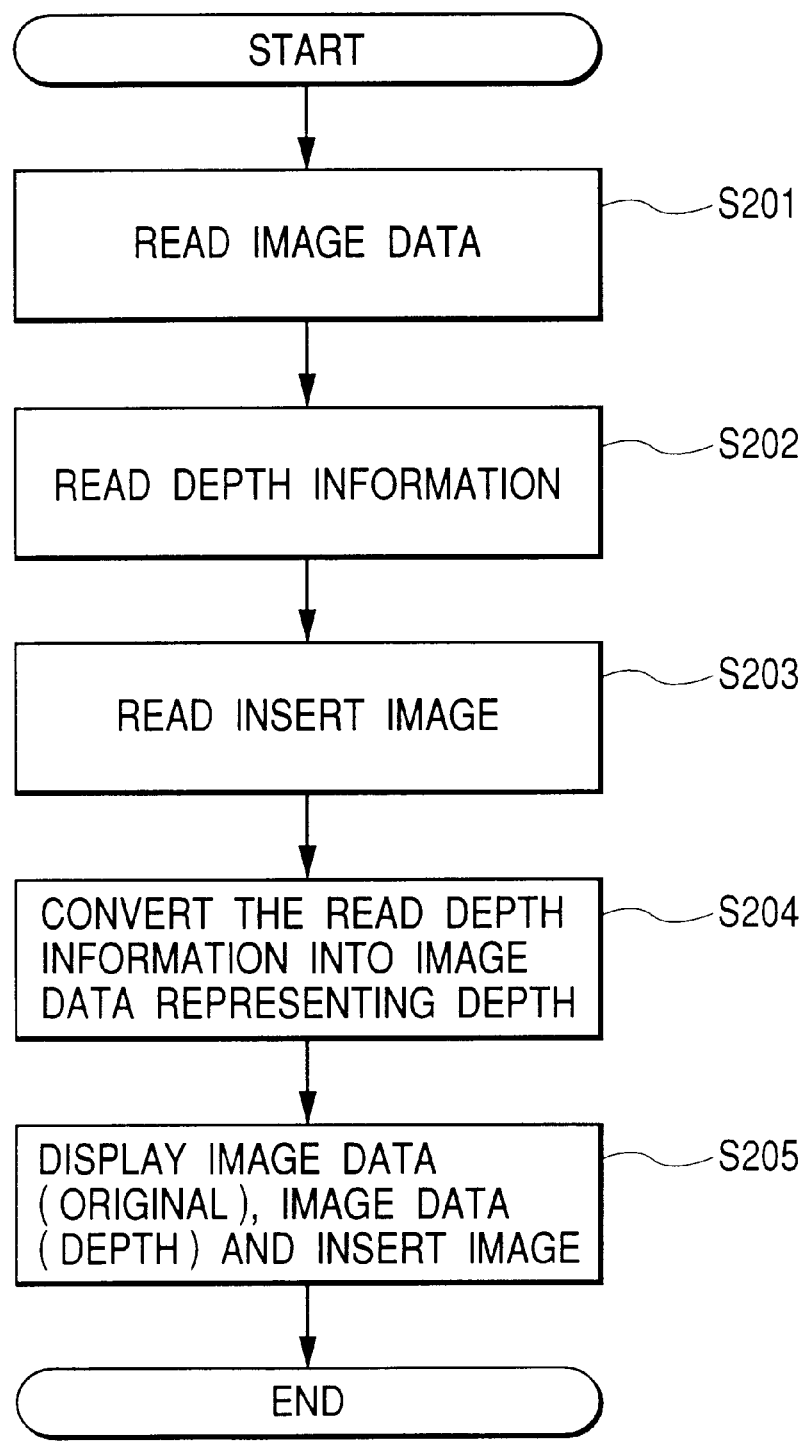
FIG. 2 is a flowchart for explaining the reading operation of image data and depth information in the image editing apparatus.
Figure 3A:
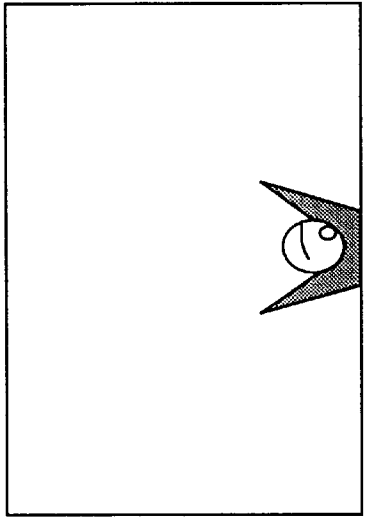
FIGS. 3A, 3B and 3C are diagrams for explaining a display of image data, depth information, and insert image in the image editing apparatus.
Figure 3B:
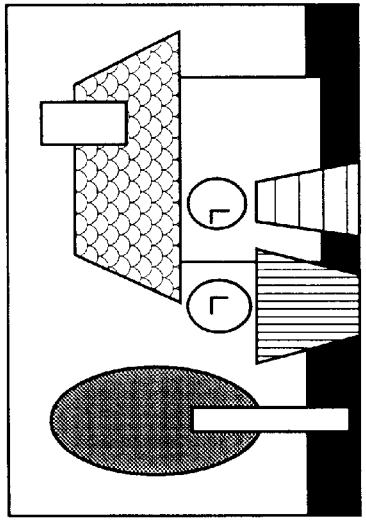
Figure 3C:
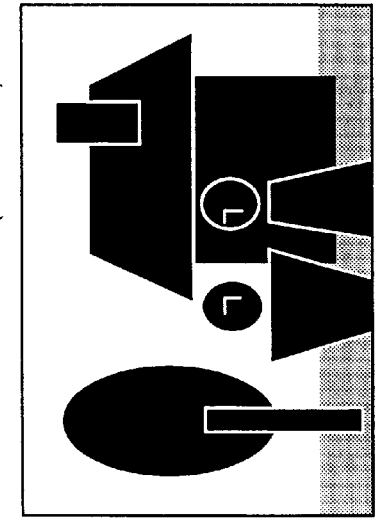

Processes in FIG. 2 are started by a start instruction of the operator. In step S201, the image data reader 100 reads the image data obtained by the image input apparatus 1409 such as a digital camera or the like into the memory. In step S202, the depth information reader 101 reads the depth information obtained by a sensor or the like annexed to the image input apparatus 1409 such as a digital camera or the like. In step S203, the insert image reader 102 reads the image to be inserted into the image data read in step S201 into the memory. In step S204, the image processor 103 converts far/near information of the depth information read in step S202 into a density (forms image data indicative of the depth). In step S205, the image data which was read in step S201 and is as shown in, for example, FIG. 3A, the image data indicative of the depth which was read in step S202 and converted in step S204 and is as shown in, for instance FIG. 3C, and the insert image which was read in step S203 and is as shown in, for example, FIG. 3B are displayed on the display 104. After that, the processing routine is finished.

The operation to designate an insert point on the image of the depth information displayed on the display 104 will now be described with reference to a flowchart of FIG. 4. A case of inserting an insert image shown in FIG. 5B to the predetermined insert point of image data shown in FIG. 5A will now be described.

Figure 5A:
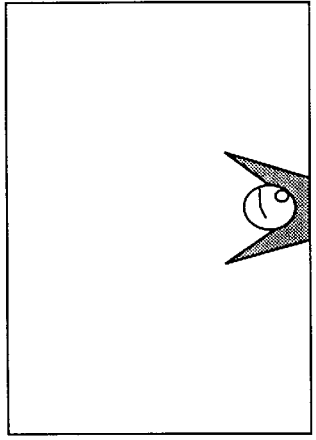
FIGS. 5A, 5B and 5C are diagrams for explaining the designating operation of the insert point on an image of depth information in the image editing apparatus.
Figure 5B:
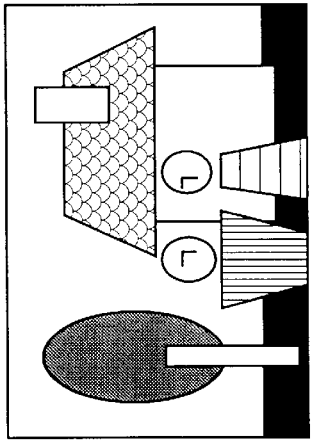
Figure 5C:
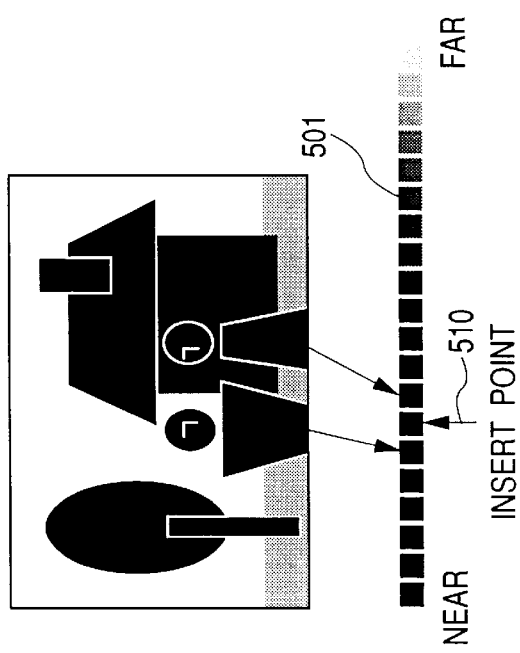

First, processes in FIG. 4 are started by a start instruction of an insert instructing operation of the operator and a dense/light value level bar 501 is displayed. In step S401, the insert position is designated by the insert point designator 105 on the basis of the image data of the depth information. On the actual screen of the display 104, an insert point 510 on the dense/light value level bar 501 is designated as shown in FIG. 5C. In step S402, highlight portions in front of and behind the point designated in step S401 are emphasized and displayed on the image of the depth information.

Such an emphasis display is realized by replacing the pixels of densities within a predetermined value from the density value designated in step S401 to, for example, different colors in a manner such that the density before the designated density (namely, the density denser than the designated density 510) and the density after the designated density (namely, the density thinner than the designated density 510) can be discriminated.

By designating the insert point on the image of the depth information, the insert point can be designated without performing a troublesome operation such as to trace an outline as in case of directly designating the point from the image data.

Figure 6:
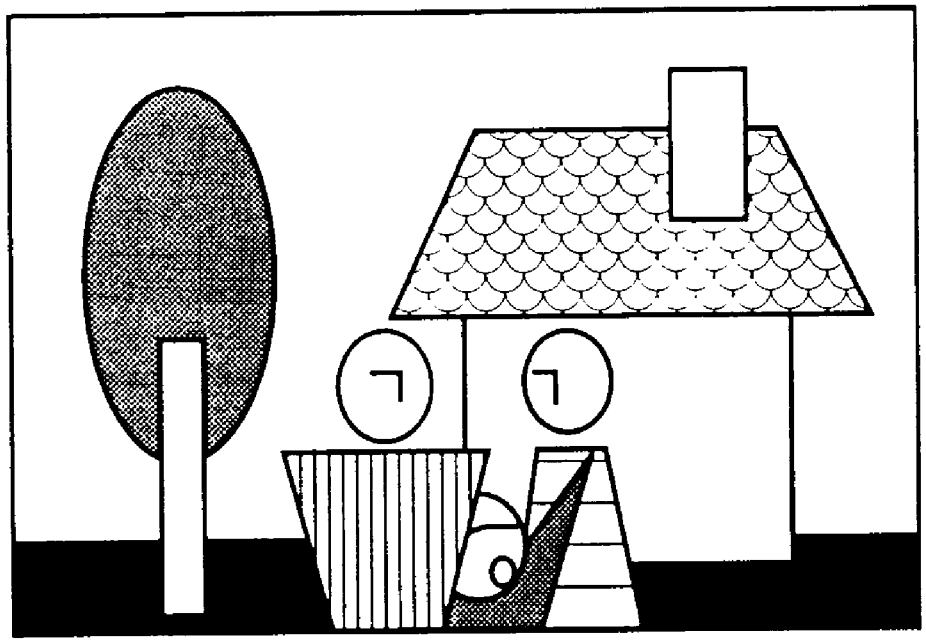
FIG. 6 is a diagram for explaining image data after the insertion in the image editing apparatus.

In step S403, a check is made to see if there is an instruction input about whether the current insert point is determined. When the instruction to decide the current insert point is not inputted, the processing routine is returned to step S401. When the deciding instruction is inputted, the insert point is determined in step S404 and, after that. the processing routine is finished. Thus, as shown in FIG. 6, the insert image is inserted to the insert point designated by the depth information. In the image data in the MEM 1402, the depth information of the pixels in which the image was inserted is updated to the depth information determined in step S404. The image formed by the inserting process is outputted from the display 1405 or printer 1406.

As mentioned above, by reading the image data and depth information of the image, converting the depth information into the image, and displaying the image onto the display 104, the insert point which has conventionally been designated by inputting an outline of the insert image on the image data or the like can be specified by designating one point on the image of the depth information. Thus, although the point on the outline had to be carefully traced conventionally, the desired insert point can be designated without performing such a troublesome operation. The invention also effectively functions even in a case where the outline between the object and the background which was difficult to be discriminated by the conventional method of designating the insert point on the image data.

[Second embodiment]

Figure 7:
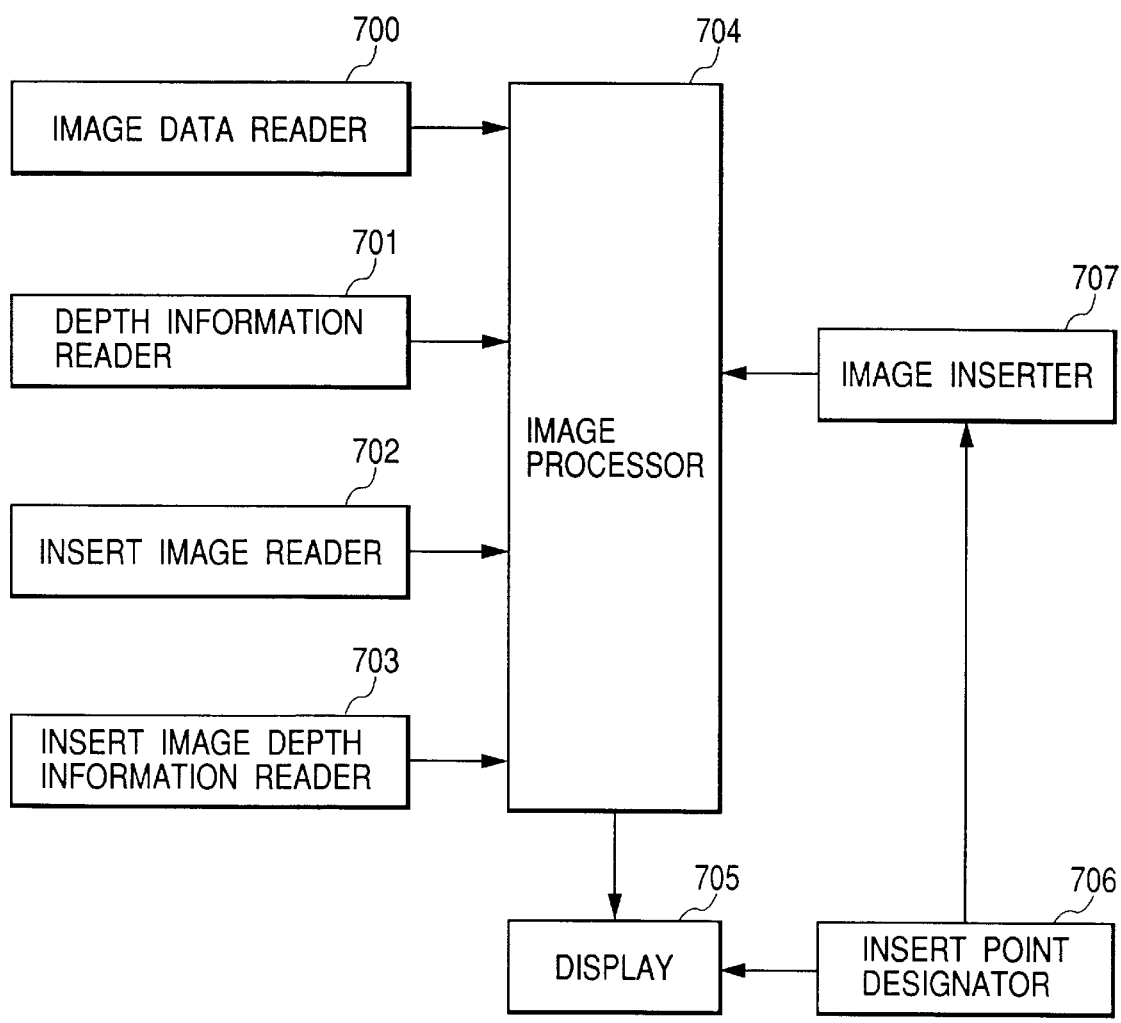
FIG. 7 is a block diagram showing a construction of an image editing apparatus according to the second embodiment of the invention.

The second embodiment of the invention will now be described with reference to FIGS. 7 to 9, 10A to 10D and 11. FIG. 7 is a block diagram showing a construction of an image editing apparatus according to the embodiment. The image editing apparatus comprises an image data reader 700, a depth information reader 701, an insert image reader 702, an insert image depth information reader 703, an image processor 704, a display 705, an insert point designator 706, and an image inserter 707.

The image data reader 700 reads image data obtained by the image input apparatus such as a scanner 1407, digital camera 1409, or the like. The depth information reader 701 reads depth information obtained by using a sensor or the like annexed to the image input apparatus 1409 such as a digital camera 1409 or the like. The insert image reader 702 reads an image which is inserted into the image data read by the image data reader 700. The insert image depth information reader 703 reads the depth information of the insert image in a manner similar to the depth information reader 701. The image processor 704 converts the depth information derived by the depth information reader 701 into image data by changing a density in a manner such that a near portion is set to be white and a far portion is set to be black. The display 705 comprising the display 1405 or the like displays the image data obtained by the image data reader 700 and the depth information converted into the image data by the image processor 704. The insert point designator 706 is the pointing device 1408 such as mouse or track pad and designates the insert point on the image of the depth information displayed by the display 705. The image inserter 707 inserts the image read by the insert image depth information reader 703 to the insert point designated by the insert point designator 706.

Although various component elements for performing the printing and the character input other than the above component elements are provided for the image editing apparatus, since they are not an essence of the invention, their descriptions are omitted.

The reading operation of the image data and depth information in the image editing apparatus constructed as mentioned above will now be described with reference to a flowchart of FIG. 8.

Figure 8:
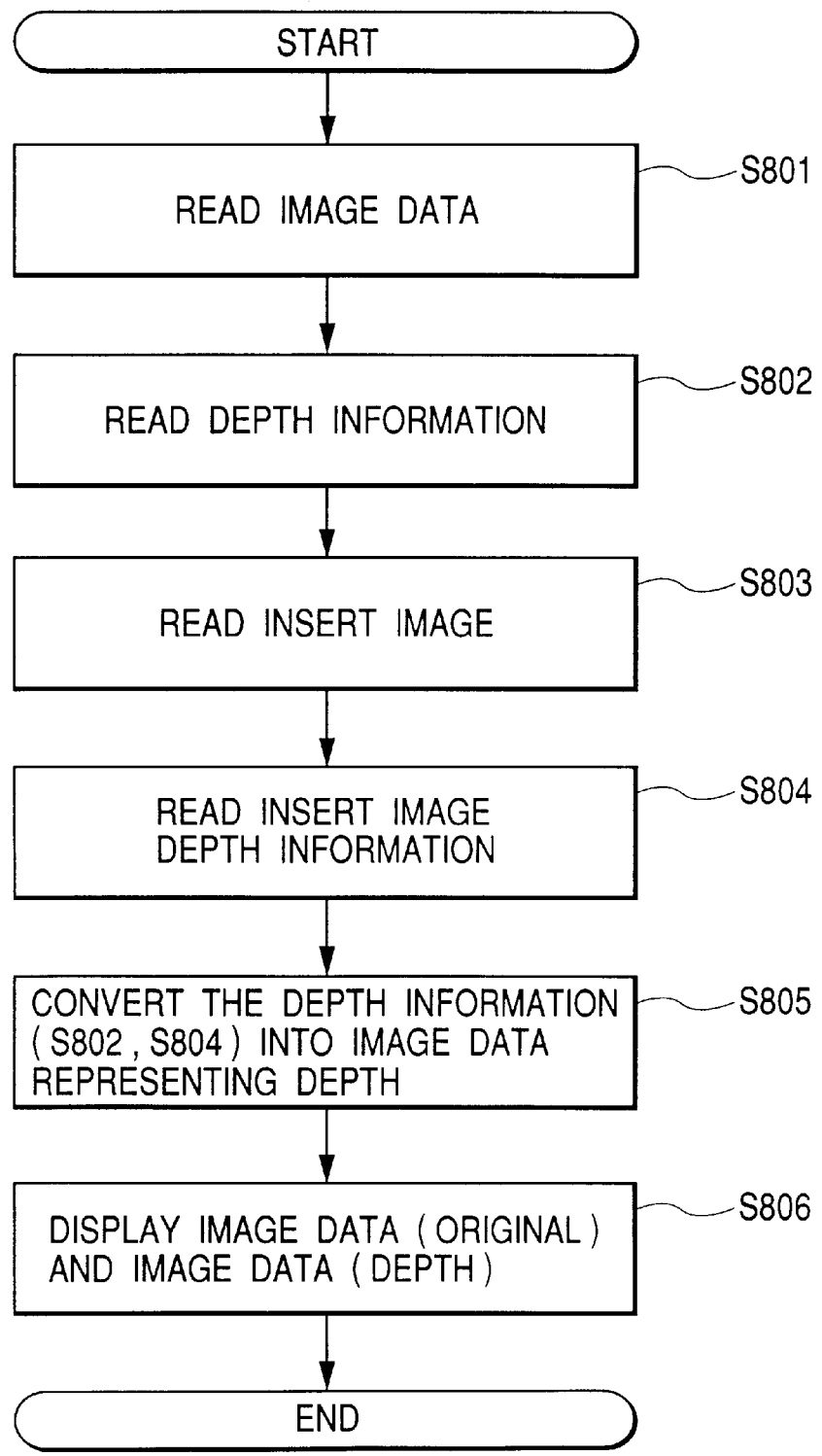
FIG. 8 is a flowchart for explaining the reading operation of image data and depth information in the image editing apparatus.

Processes in FIG. 8 are started by a start instruction of the operator. In step S801, the image data reader 700 reads the image data derived by the image input apparatus such as a digital camera or the like into the memory. In step S802, the depth information reader 701 reads the depth information by the sensor or the like annexed to the image input apparatus such as a digital camera or the like. In step S803, the insert image reader 702 reads an image to be inserted into the image data read in step S801 into the memory. In step S804, the insert image depth information reader 703 reads the depth information of the insert image into the memory. In step S805, the image processor 704 converts far/near information of the depth information read in steps S802 and S804 into a density, thereby forming the image data showing the depth. In step S806, the image data read in step S801 and the image data showing the depth converted in step S805 are displayed on the display 705. After that, the processing routine is finished.

The operation to designate the insert point on the image of the depth information displayed on the display 705 will now be described with reference to a flowchart of FIG. 9. A case of inserting an insert image shown in FIG. 10B to a predetermined insert point of image data shown in FIG. 10A will now be explained.

Figure 9:
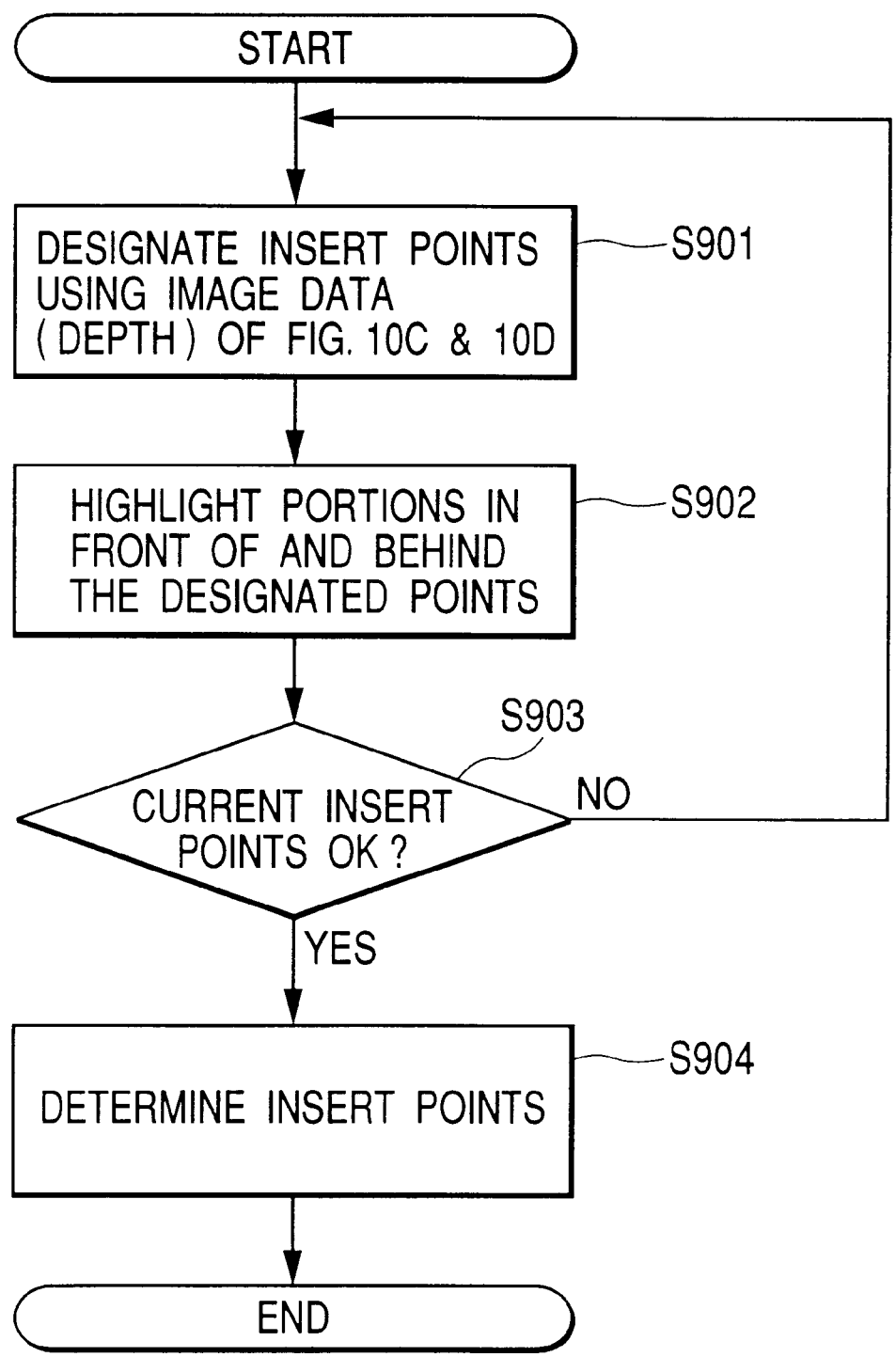
FIG. 9 is a flowchart for explaining the designating operation of an insert point of the image data in the image editing apparatus.
Figure 10A:
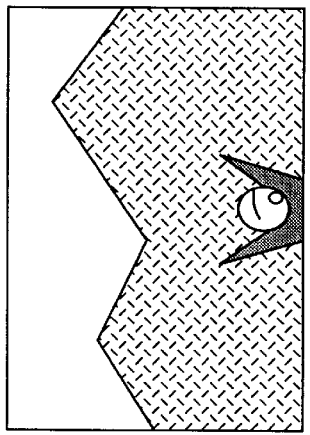
FIGS. 10A, 10B, 10C and 10D are diagrams for explaining the designating operation of the insert point on an image of depth information in the image editing apparatus.
Figure 10B:
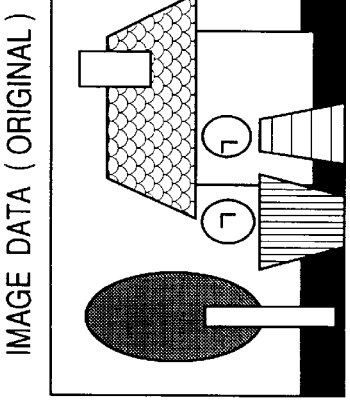
Figure 10C:
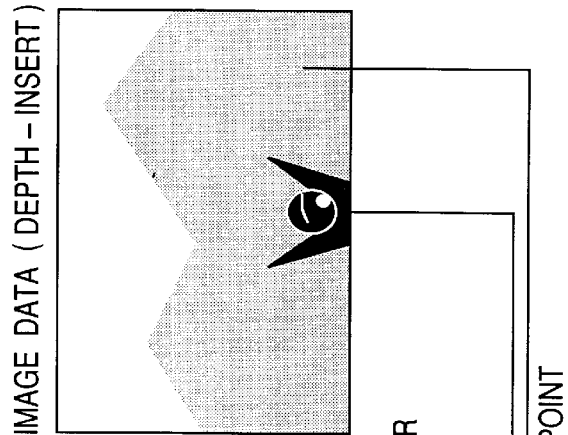
Figure 10D:
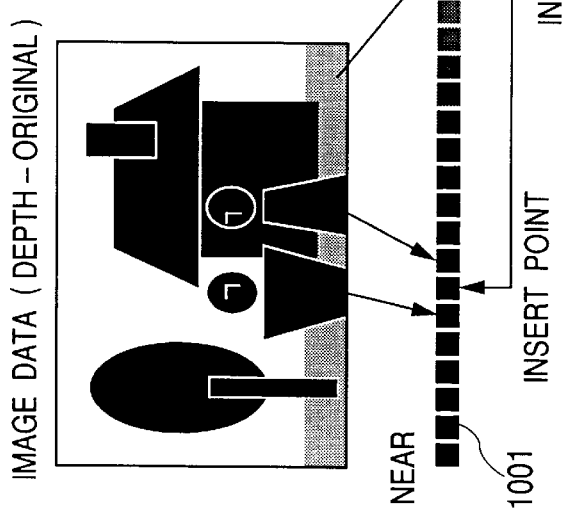
Figure 11:
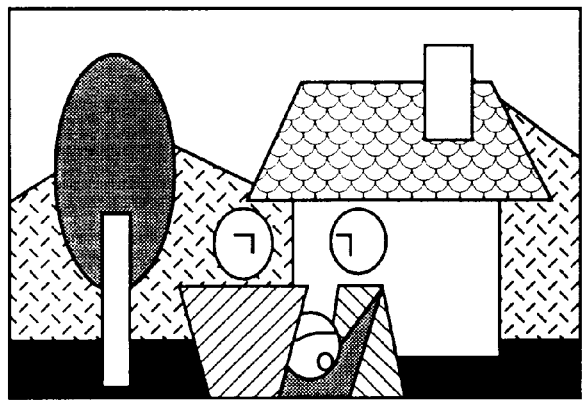
FIG. 11 is a diagram for explaining image data after the insertion in the image editing apparatus.

First, processes in FIG. 9 are started by a start instruction of the operator. In step S901, an insert point is designated on the image of the depth information by the insert point designator 706. On the actual screen of the display 705, an image which should be inserted on a dense/light value level bar 1001 as shown in FIG. 10C and was selected from insert image depth information shown in FIG. 10D becomes an arrow of "InsertPoint". This arrow is moved on the dense/light value level bar 1001, thereby deciding. In step S902, highlight portions in front of and behind the point designated in step S901 are emphasized and displayed on the image of the depth information. In step S903, a check is made to see if the current insert point is decided. If NO, the processing routine is returned to step S901. If the current insert point is decided, the insert point is determined in step S904. After that, the processing routine is finished. As shown in FIG. 11, consequently, the insert image is inserted to the insert point designated by the depth information. The image formed by the inserting process is outputted by the display 1405 or printer 1406.

As mentioned above, by reading the image data of the image, depth information, insert image, and depth information of the insert image, converting the depth information into the image, and displaying, the insert range which has conventionally been designated on the image data can be designated on the image of the depth information. Thus, although a point on the outline had to be carefully traced hitherto, a desired range can be designated without performing such a troublesome operation. Since the insert point can also be designated on the image of the depth information, there is no need to cut out the insert image in accordance with the insert point.

[Third embodiment]

Figure 12:
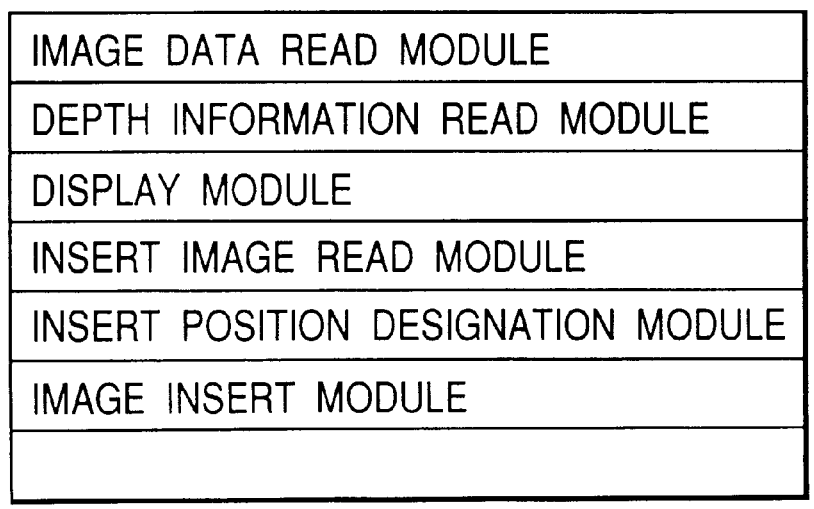
FIG. 12 is a diagram showing each program module of a program which is stored in a storage medium of the invention.
Figure 13:
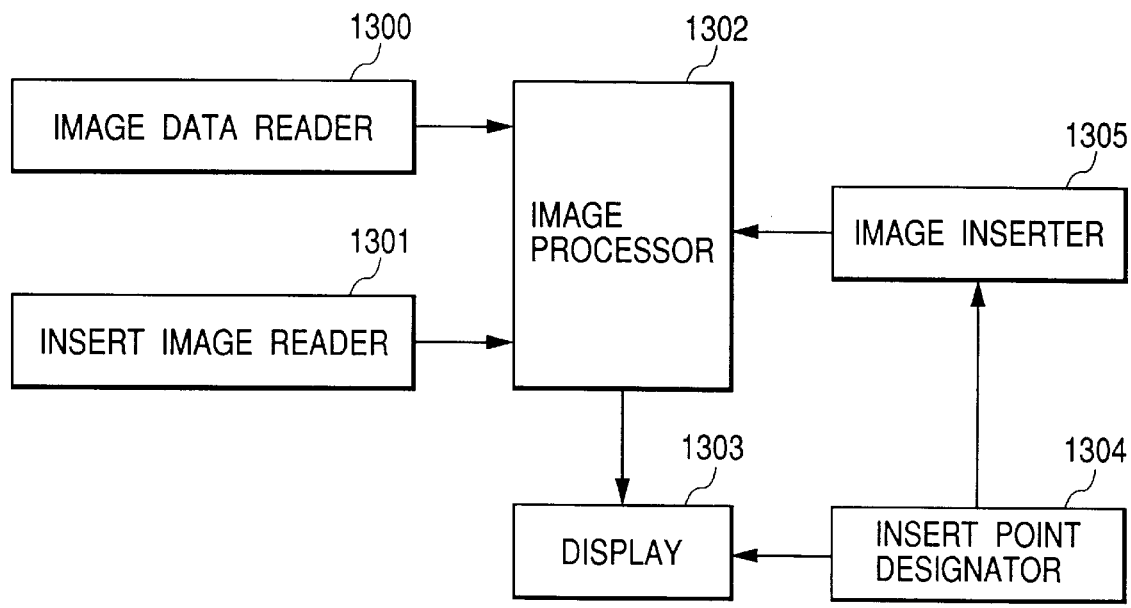
FIG. 13 is a block diagram showing a construction of a conventional image editing apparatus.

The storage 1403 of the invention will now be described with reference to FIG. 12. As shown in FIG. 12, in the storage 1403 to store a program for controlling the image editing apparatus to edit an image, it is sufficient to store program codes having each of program modules of at least "image data read module", "depth information read module", "display module", "insert image read module", "insert point designation module", and "image insert module".

The "image data read module" is a program module to read the image data of the image. The "depth information read module" is a program module to read the depth information of the image data read by the image data read module. The "display module" is a program module to display the image data read by the image data read module and the depth information read by the depth information read module as an image. The "insert image read module" is a program module to read the image to be inserted into the image data read by the image data read module. The "insert point designation module" is a program module to designate an insert point of the insert image read by the insert image read module. The "image insert module" is a program module for inserting the insert image to the insert point designated by the insert point designation module.

What is claimed is:

1. An image editing method comprising the steps of:
   obtaining an image object defined by an output area and a depth information of the image object which is specified by a user; and
   inserting, on the basis of a comparison result of
   i) the depth information of the obtained image object and
   ii) respective depth information of objects read out from a memory storing an image data comprised of plural objects whose depths are different and whose output areas are defined, the obtained image object into the stored image data.

2. A method according to claim 1, wherein the image data formed by inserting the insert image data is displayed on display means.

3. A method according to claim 1, wherein the image data formed by inserting the insert image data is printed by printing means.

4. A method according to claim 1, wherein the image data is inputted by a digital camera.

5. A method according to claim 1, wherein the depth information is inputted by a digital camera.

6. A method according to claim 1, wherein the image data is inputted from another terminal through a communication line.

7. A method according to claim 1, wherein the depth information is inputted from another terminal through a communication line.

8. A method according to claim 1, wherein the image data is read from a storage medium which is detachable for an apparatus main body.

9. A method according to claim 1, wherein the depth information is read from a storage medium which is detachable for an apparatus main body.

10. A method according to claim 1, wherein the depth is an absolute distance from a camera to each object, which is obtained when the image is photographed by using a sensor.

11. A method according to claim 1, further comprising the steps of;

generating a depth image representing a depth which shows the depth and area of each image object; and
   outputting the generated depth image.

12. A method according to claim 11, wherein the depth information is obtained based on a point specified on the output depth image.

13. A method according to claim 1, further comprising the step of outputting an image designating the depths of the every objects on an axis.

14. A method according to claim 13, wherein the depth information is obtained based on a point specified on the output depth image.

15. A method according to claim 12 or 14, wherein the point is specified by a pointing device.

16. A method according to claim 12 or 14, wherein the point is specified by a mouse.

17. A method according to claim 12 or 14, wherein the point is specified by a tablet.

18. A method according to claim 12 or 14, wherein the point is specified by a track pad.

19. An image editing apparatus comprising:
   storing means for storing an image data comprise of plural objects whose depths are different and whose output areas are defined;
   obtaining means for obtaining an image object defined by an output area and depth information of the image object which is specified by a user; and
   inserting means for inserting, on the basis of a comparison result of
   i) the depth information of the obtained image object and
   ii respective depth information of the stored objects, the obtained image object into the stored image.

20. An apparatus according to claim 19, wherein the insert point specifying means specifies the insert point by depth information.

21. An apparatus according to claim 19, further comprising:
   depth information converting means for converting the depth information into image data showing a depth,
   and wherein the insert point specifying means specifies the insert point on a display picture plane displaying image data indicative of the converted depth by the depth information converting means.

22. An apparatus according to claim 19, further comprising:
   converting means for converting the depth information into density information; and
   display means for displaying the converted density information.

23. An apparatus according to claim 19, further comprising:
   insert image data depth information input means for inputting the depth information of the image data which is inserted; and
   depth information comparing means for comparing the depth information of the insert image data with the depth information of the image data on the insert destination side,
   and wherein said image editing means inserts the insert image data into the image data on the insert destination side on the basis of a result of the comparison.

24. An apparatus according to claim 19, wherein the insertion of the image data is a process for replacing a part of the image data on the insert destination side to a part of the insert image data.

25. An apparatus according to claim 19, wherein said insert point specifying means is a pointing device.

26. An apparatus according to claim 19, wherein said insert point specifying means is a mouse.

27. An apparatus according to claim 19, wherein said insert point specifying means is a tablet.

28. An apparatus according to claim 19, wherein said insert point specifying means is a track pad.

29. An apparatus according to claim 19, further comprising display means for displaying the image data formed by said image editing means.

30. An apparatus according to claim 19, further comprising print means for printing the image data formed by said image editing means.

31. An apparatus according to claim 19, wherein the image data is an image inputted by a digital camera.

32. An apparatus according to claim 19, wherein the depth information is information inputted by a digital camera.

33. An apparatus according to claim 19, wherein the image data is an image inputted from another terminal through a communication line.

34. An apparatus according to claim 19, wherein the depth information is information inputted from another terminal through a communication line.

35. An apparatus according to claim 19, wherein the image data is an image read from a storage medium which is detachable for an apparatus main body.

36. An apparatus according to claim 19, wherein the depth information is information read from a storage medium which is detachable for an apparatus main body.

37. An apparatus according to claim 19, further comprising:

display means for displaying a dense/light value level bar, and wherein said insert point specifying means sets a density value specified on the displayed dense/light value level bar to the insert point.

38. An apparatus according to claim 19, wherein the depth is an absolute distance from a camera to each object which is obtained when the image is photographed by using a sensor.

39. An apparatus according to claim 19, wherein the depth information is a relative distance between objects photographed in an image.

40. A computer-readable medium encoded with:

a module for obtaining an image object defined by an output area and a depth information, which is specified by a user, of the image object; and a module for inserting, on the basis of a comparison result of i) the depth information of the obtained image object and ii) respective depth information of objects read out from a memory storing an image data comprised of plural objects whose depths are different and whose output areas are defined, the obtained image object into the stored image data.

* * * * *

UNITED STATES PATENT AND TRADEMARK OFFICE
CERTIFICATE OF CORRECTION

PATENT NO.    : 6,069,713
DATED         : May 30, 2000
INVENTOR(S)   : KIYOSHI KUSAMA

It is certified that error appears in the above-identified patent and that said Letters Patent is hereby corrected as shown below:

COLUMN 2:

Line 8, "3∧," should read --3A,--; and
    Line 15, "5∧," should read --5A,--.

COLUMN 3:

Line 56, "be also" should read --also be--.

COLUMN 5:

Line 14, "that." should read --that,--.

COLUMN 7:

Line 66, "∧" should read --A--.

UNITED STATES PATENT AND TRADEMARK OFFICE
CERTIFICATE OF CORRECTION

PATENT NO. : 6,069,713
DATED : May 30, 2000
INVENTOR(S) : KIYOSHI KUSAMA

Page 2 of 2

It is certified that error appears in the above-identified patent and that said Letters Patent is hereby corrected as shown below:

COLUMN 8:

Line 22, "comprise" should read --comprised--; and
    Line 31, "ii" should read --ii)--.

Signed and Sealed this

Fifteenth Day of May, 2001

Attest:

NICHOLAS P. GODICI

*Attesting Officer*    *Acting Director of the United States Patent and Trademark Office*